US008939217B2

(12) United States Patent
Kolle

(10) Patent No.: US 8,939,217 B2
(45) Date of Patent: *Jan. 27, 2015

(54) HYDRAULIC PULSE VALVE WITH IMPROVED PULSE CONTROL

(71) Applicant: Tempress Technologies, Inc., Kent, WA (US)

(72) Inventor: Jack J. Kolle, Seattle, WA (US)

(73) Assignee: Tempress Technologies, Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,063

(22) Filed: Jul. 24, 2013

(65) Prior Publication Data
US 2013/0306319 A1 Nov. 21, 2013

Related U.S. Application Data

(63) Continuation of application No. 12/957,049, filed on Nov. 30, 2010, now Pat. No. 8,528,649.

(51) Int. Cl.
*E21B 34/06* (2006.01)
*E21B 34/00* (2006.01)
(Continued)

(52) U.S. Cl.
CPC .............. *E21B 34/10* (2013.01); *E21B 21/10* (2013.01); *F16K 31/122* (2013.01); *E21B 37/00* (2013.01); *E21B 43/25* (2013.01)
USPC .......................................... 166/373; 166/321

(58) Field of Classification Search
USPC ............. 166/321, 373, 374; 137/14, 105, 488
See application file for complete search history.

(56) References Cited

U.S. PATENT DOCUMENTS

| 699,273 A | 5/1902 | Wolski |
| 1,963,090 A | 6/1934 | Jakosky |

(Continued)

FOREIGN PATENT DOCUMENTS

| DE | 1568680 | 6/1980 |
| SU | 587240 | 10/1972 |

OTHER PUBLICATIONS

Borland et al., "Drill Bit Seismic, Vertical Seismic Profiling, and Seismic Depth Imaging to Aid Drilling Decisions in the Tho Tinh Structure Nam Con Son Basin—Vietnam." Butsuri-Tansa vol. 51, No. 1: 27-44, 1998.

(Continued)

*Primary Examiner* — Kenneth L Thompson
*Assistant Examiner* — Michael Wills, III
(74) *Attorney, Agent, or Firm* — Morgan, Lewis & Bockius LLP

(57) ABSTRACT

Hydraulic pulses are produced each time that a pulse valve interrupts the flow of a pressurized fluid through a conduit. The pulse valve includes an elongate housing having an inlet configured to couple to the conduit to receive the pressurized fluid, and an outlet configured to couple to one or more tools. In the housing, a valve assembly includes a poppet reciprocating between open and closed positions, and a poppet seat, in which the poppet closes to at least partially block the flow of pressurized fluid through the valve. A pilot within the poppet moves between disparate positions to modify fluid paths within the valve. When the valve is open, a relatively lower pressure is produced by a Venturi effect as the fluid flows through a throat in the poppet seat, to provide a differential pressure used to move the pilot and poppet. An optional bypass reduces the pulse amplitude.

50 Claims, 8 Drawing Sheets

(51) Int. Cl.
*E21B 34/10* (2006.01)
*E21B 21/10* (2006.01)
*F16K 31/122* (2006.01)
*E21B 37/00* (2006.01)
*E21B 43/25* (2006.01)

(56) References Cited

U.S. PATENT DOCUMENTS

| | | |
|---|---|---|
| 2,342,732 A | 2/1944 | Gudmundsen |
| 2,359,629 A | 10/1944 | Dexter et al. |
| 2,388,741 A | 11/1945 | Hays |
| 2,421,769 A | 6/1947 | Wolfe |
| 2,445,803 A | 7/1948 | Rogers |
| 2,492,605 A | 12/1949 | Varney et al. |
| 2,535,079 A | 12/1950 | Lebert |
| 2,543,063 A | 2/1951 | Rodgers |
| 2,562,721 A | 7/1951 | Jakosky |
| 2,562,724 A | 7/1951 | Lebert |
| 2,743,083 A | 4/1956 | Zublin |
| 2,855,671 A | 10/1958 | Lundgren et al. |
| 2,902,258 A | 9/1959 | Hildebrant |
| 2,963,099 A | 12/1960 | Gianelloni, Jr. |
| 3,054,595 A | 9/1962 | Kaufmann |
| 3,058,510 A | 10/1962 | Tiraspolsky et al. |
| 3,065,805 A | 11/1962 | Martini |
| 3,433,489 A | 3/1969 | Wiese |
| 3,441,094 A | 4/1969 | Gallo et al. |
| 3,520,225 A | 7/1970 | Baugh |
| 3,568,783 A | 3/1971 | Chenoweth et al. |
| 3,603,410 A | 9/1971 | Angona |
| 3,606,410 A | 9/1971 | Inserra |
| 3,648,786 A | 3/1972 | Chenoweth |
| 3,648,789 A | 3/1972 | Eriksson |
| 3,655,424 A | 4/1972 | Orowan |
| 3,728,040 A | 4/1973 | Ioanesian et al. |
| 3,802,515 A | 4/1974 | Flamand et al. |
| 3,810,637 A | 5/1974 | Bonvin |
| 4,033,429 A | 7/1977 | Farr |
| 4,114,703 A | 9/1978 | Matson, Jr. et al. |
| 4,190,202 A | 2/1980 | Yie |
| 4,196,911 A | 4/1980 | Matsushita |
| 4,213,332 A | 7/1980 | Bonomo et al. |
| 4,225,000 A | 9/1980 | Maurer |
| 4,246,976 A | 1/1981 | McDonald, Jr. |
| 4,324,299 A | 4/1982 | Nagel |
| 4,418,721 A | 12/1983 | Holmes |
| 4,437,525 A | 3/1984 | O'Hanlon et al. |
| 4,440,242 A | 4/1984 | Schmidt et al. |
| 4,454,935 A | 6/1984 | Pryor |
| 4,493,381 A | 1/1985 | Kajikawa et al. |
| 4,521,167 A | 6/1985 | Cavalleri et al. |
| 4,529,046 A | 7/1985 | Schmidt et al. |
| 4,573,637 A | 3/1986 | Pater et al. |
| 4,665,997 A | 5/1987 | Maurer et al. |
| 4,715,538 A | 12/1987 | Lingnau |
| 4,747,544 A | 5/1988 | Kranzle et al. |
| 4,762,277 A | 8/1988 | Pater et al. |
| 4,790,393 A | 12/1988 | Larronde et al. |
| 4,793,435 A | 12/1988 | Smith et al. |
| 4,817,739 A | 4/1989 | Jeter |
| 4,819,745 A | 4/1989 | Walter |
| 4,821,961 A | 4/1989 | Shook |
| 4,830,122 A | 5/1989 | Walter |
| 4,862,043 A | 8/1989 | Zieve |
| 4,863,101 A | 9/1989 | Pater et al. |
| 4,890,682 A | 1/1990 | Worrall et al. |
| 4,905,775 A | 3/1990 | Warren et al. |
| 4,923,120 A | 5/1990 | Hammelmann |
| 4,925,510 A | 5/1990 | Hojo et al. |
| 4,928,509 A | 5/1990 | Nakamura |
| 4,934,254 A | 6/1990 | Clark et al. |
| 4,979,577 A | 12/1990 | Walter |
| 4,997,159 A | 3/1991 | Yoshino et al. |
| 5,000,516 A | 3/1991 | Kolle et al. |
| 5,009,272 A | 4/1991 | Walter |
| 5,028,004 A | 7/1991 | Hammelmann |
| 5,051,020 A | 9/1991 | Schleicher |
| 5,121,537 A | 6/1992 | Matsui et al. |
| 5,190,114 A | 3/1993 | Walter |
| 5,191,557 A | 3/1993 | Rector et al. |
| 5,222,425 A | 6/1993 | Davies |
| 5,279,262 A | 1/1994 | Muehleck |
| 5,319,610 A | 6/1994 | Airhart |
| 5,382,760 A | 1/1995 | Staron et al. |
| 5,396,965 A | 3/1995 | Hall et al. |
| 5,603,385 A | 2/1997 | Colebrook |
| 5,646,379 A | 7/1997 | Hsu et al. |
| 5,685,487 A | 11/1997 | Ellis |
| 5,703,421 A | 12/1997 | Durkin |
| 5,740,127 A | 4/1998 | Van Steenwyk et al. |
| 5,803,188 A | 9/1998 | McInnes |
| 5,909,848 A | 6/1999 | Zink |
| 5,909,879 A | 6/1999 | Simpson |
| 5,938,206 A | 8/1999 | Klosterman et al. |
| 5,950,736 A | 9/1999 | Goldstein |
| 5,953,809 A | 9/1999 | Kowalski |
| 6,027,040 A | 2/2000 | Frye-Hammelmann |
| 6,053,261 A | 4/2000 | Walter |
| 6,062,311 A | 5/2000 | Johnson et al. |
| 6,094,401 A | 7/2000 | Masak et al. |
| 6,191,511 B1 | 2/2001 | Zysset |
| 6,237,701 B1 | 5/2001 | Kolle et al. |
| 6,263,969 B1 | 7/2001 | Stoesz et al. |
| 6,301,766 B1 | 10/2001 | Kolle |
| 6,347,675 B1 | 2/2002 | Kolle |
| 6,394,221 B2 | 5/2002 | Cosma |
| 6,453,996 B1 | 9/2002 | Carmichael et al. |
| 6,557,856 B1 | 5/2003 | Azibert et al. |
| 6,774,519 B2 | 8/2004 | Pullen et al. |
| 6,951,262 B2 | 10/2005 | West |
| 6,952,068 B2 | 10/2005 | Gieras et al. |
| 6,964,270 B2 | 11/2005 | Janssen et al. |
| 7,139,219 B2 | 11/2006 | Kolle et al. |
| 7,198,456 B2 | 4/2007 | Kolle et al. |
| 7,201,238 B2 | 4/2007 | Marvin et al. |
| 7,310,580 B2 | 12/2007 | Zhou et al. |
| 7,524,160 B2 | 4/2009 | Kolle et al. |
| 2001/0030486 A1 | 10/2001 | Pijanowski |
| 2004/0069530 A1 | 4/2004 | Prain et al. |
| 2005/0028797 A1 | 2/2005 | Janssen et al. |
| 2005/0178558 A1 | 8/2005 | Kolle et al. |
| 2009/0154290 A1 | 6/2009 | Radtke et al. |
| 2012/0132289 A1 | 5/2012 | Kolle et al. |
| 2013/0000917 A1 | 1/2013 | Slack et al. |

OTHER PUBLICATIONS

Kolle, Jack K., "A Comparison of Water Jet, Abrasive Jet and Rotary Diamond Drilling in Hard Rock." Presentation for Energy Sources Technology Conference & Exhibition (ETCE '98), Houston, TX: 6pp., Feb. 2-4, 1998.

Kolle, Jack K., "Moving an Ice Mountain." Mechanical Engineering: 49-53, Feb. 1990.

Park, Choon Byong; Miller, Richard D.; Steples, Don W.; and Black, Ross A., "Swept impact seismic techniques (SIST)." Geophysics. vol. 61, No. 6 (Nov.-Dec. 1996): p. 1789-1803. 13 FIGs.

Rector et al., "The use of drill-bit energy as a downhole seismic source." Geophysics vol. 56. No. 5:628-634, May 1991.

SECTION A-A

SECTION B-B

SECTION C-C

SECTION D-D

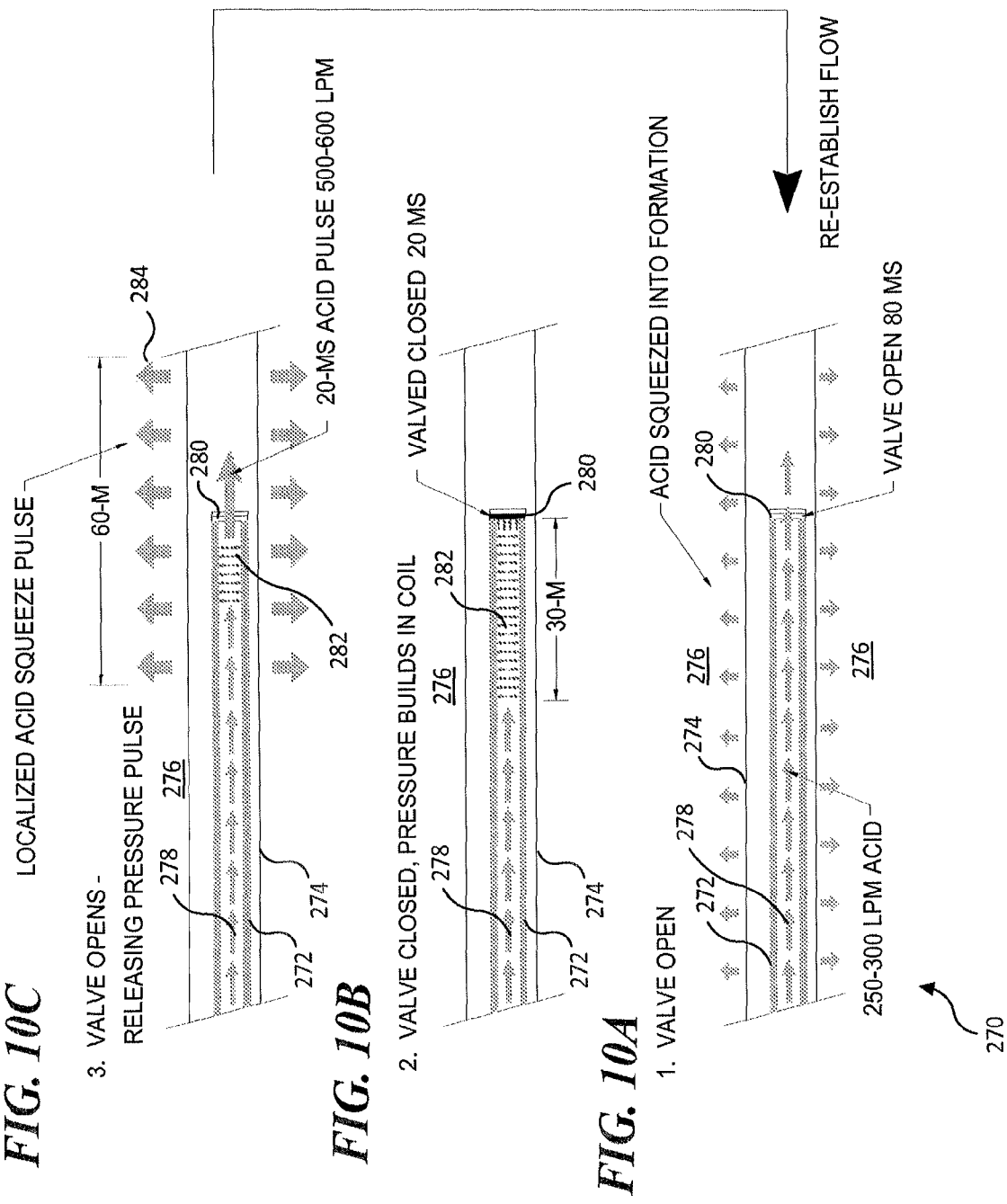

HYDRAULIC PULSE VALVE WITH IMPROVED PULSE CONTROL

CROSS-REFERENCE TO RELATED APPLICATIONS

This application is a continuation of U.S. patent application Ser. No. 12/957,049, filed on Nov. 30, 2010.

BACKGROUND

Fluid is commonly pumped though tubing inserted into a well to drill or to provide intervention services such as stimulation or milling of obstructions. Means for pulsing this flow have been developed for a variety of applications, including mud pulse telemetry, well stimulation, enhanced drilling, and for use in extending the lateral range of drilling motors or other well intervention tools. For example, U.S. Pat. Nos. 6,237,701 and 7,139,219, which are assigned to the same assignee of the present invention, disclose hydraulic impulse generators incorporating self-piloted poppet valves designed to periodically stop the flow of fluid at the bottom end of the tubing. Stopping the flow leads to an increase in pressure upstream of the valve and a decrease in pressure downstream of the valve.

Pressure pulsations in the tubing disposed upstream of the bottom hole assembly (BHA) provide a plurality of beneficial effects. For example, the pulsations can improve the performance of rotary drilling by applying a cyclical mechanical load on the bit and a cyclic pressure load on the material that is being cut. In combination, these loads can enhance cutting. The vibrations induced by these cutting tools in the tubing can reduce the friction required to feed the tubing into long wells that deviate from a straight bore line.

The self-piloted poppet valve also generates pressure fluctuations in the wellbore near the tool. These pressure fluctuations can enhance chemical placement in the formation and enhance the production of formation fluids, such as oil or gas. In addition, the pressure pulses can also be used to generate a signal that can be employed for seismic processing.

The valve designs disclosed in U.S. Pat. Nos. 6,237,701 and 7,139,219 generate a relatively short pressure pulse, which limits pulse energy and effectiveness. These designs are also subject to relatively high differential pressure, which causes the tools to cycle at high speed, leading to wear and breakdown, and limiting the flow and pressure available to operate other tools, such as motors and jetting tools. The pulse amplitude generated by the hydraulic impulse tools is determined by the flow rate of fluid. An independent means for controlling pulse amplitude is required in order to accommodate the varying fluid flow rate requirements of a job, which may be determined by hole cleaning requirements in wells that deviate from a straight bore line, or by the limited size of tubing available for coiled tubing well intervention.

It would thus be desirable to increase the duration of the hydraulic impulse in order to increase impulse energy and effective range. It would further be desirable to reduce the pressure differential required to operate a hydraulic impulse generator. In addition, the cycle rate should be reduced to allow seismic interpretation and pore pressure prediction when the tools is used as a seismic source. Finally, it would be desirable to include means for controlling the impulse amplitude, while maintaining pulse duration and cycle rate.

SUMMARY

The following discussion discloses a novel pulse valve that is useful for a range of wellbore intervention applications. In accord with the present novel approach, one exemplary pulse valve that is used for producing pressure pulses within a conduit includes an elongate housing. The housing has an internal passage for conveying a pressurized fluid between an inlet disposed on one end of the housing and an outlet disposed on an opposite end of the housing. The inlet is configured to couple to a source of the pressurized fluid (which will normally be conveyed through a conduit), and the outlet is configured to provide the pressurized fluid flowing through the outlet to a component (such as another tool) that is coupled to the housing. A poppet seat is disposed adjacent to the outlet and includes a constricted throat. At least one port is disposed in the throat and is coupled in fluid communication with an internal volume. A valve assembly is also disposed within the elongate housing and includes a poppet that is reciprocally movable between a closed position in which it at least partially blocks pressurized fluid from flowing through the poppet seat, and an open position in which the pressurized fluid flows through the throat of the poppet seat. A pilot that is disposed within the poppet and reciprocates between a disparate first and second positions to alter fluid communication paths within the valve assembly. A plurality of fluid passages are configured to be in various fluid communication configurations, based upon positions of the pilot and of the poppet within the valve assembly. The pilot and the poppet move in response to differential pressures developed in the valve assembly. For example, a differential pressure arises as a result of a higher pressure of the pressurized fluid within the internal passage and a relatively lower pressure produced in the at least one port in the throat and adjacent volume while the poppet is in the open position. The relatively lower pressure is produced in the at least one port by a Venturi effect as the pressurized fluid flows through the throat of the poppet seat when the poppet is in the open position.

A pressure pulse is produced each time that the poppet moves to the closed position to at least partially block pressurized fluid flowing through the throat of the poppet seat and into the outlet. Those skilled in the art will recognize that at least partially blocking the flow of a fluid in a conduit will generate a "water-hammer" pressure pulse that results from the conversion of the kinetic energy of the moving fluid into the potential energy of pressurization and compression of the fluid. The amplitude of this pressure pulse is directly proportional to the speed of the fluid at the time the flow was at least partially interrupted. The pressure amplitude is highest in relatively incompressible fluids such as water, but useful pulses are also generated in more compressible fluids, such as oil or mixtures of liquid and pressurized gas. The pressure pulse propagates upstream in the conduit at the speed of sound in the fluid. The total energy of each pulse is proportional to the time required for the valve to at least partially close.

The movement of the pilot between the first and second positions reconfigures fluid communication paths in the valve assembly, to apply the differential pressures that cause the poppet to move between the open and closed positions. The movement of the poppet between the open and closed positions also causes changes in fluid communication paths in the valve assembly. The changes apply the differential pressures that cause the pilot to move between the disparate first and second positions.

The poppet seat optionally includes a bypass path that enables some of the pressurized fluid to continue flowing through the outlet of the pulse valve when the poppet is in the closed position. This continuing flow thus reduces the amplitude of the pressure pulses produced by moving the poppet to the closed position, compared to the amplitude resulting from fully blocking the flow of pressurized fluid through the outlet. The bypass path can comprise one or more grooves in the poppet seat, or one or more ports in the poppet seat. The grooves or ports are in fluid communication with the internal passage conveying pressurized fluid and are not sealed by the poppet when the poppet is in the closed position. As a further alternative, the bypass path can comprise an annular opening between the poppet and the poppet seat, which is not sealed by the poppet when the poppet is in the closed position.

When the poppet is at least partially closed, a differential pressure is also produced between a lower pressure in the outlet and a higher pressure in the internal passage in which the pressurized fluid is conveyed. This differential pressure is applied through fluid paths in the valve assembly to cause the pilot to move between the disparate first and second positions.

One of advantage of this pulse valve arises because the elongate housing is configured so that all of the pressurized fluid entering the inlet flows through the outlet. In contrast with some earlier pulse valves, none of the pressurized fluid is dumped through a port in the house sidewall into a borehole surrounding the housing.

Another aspect of the present novel approach is directed to a method for producing pressure pulses. The method generally includes steps that are consistent with the functions implemented by the components of the exemplary pulse valve discussed above.

The benefits of using a pulse valve like the present exemplary device for interrupting all or most of the drilling fluid flow to a drill bit to create pressure fluctuations or pulses in a borehole are well known. These benefits include the following:

When the pressure below the bit rapidly decreases to less than the rock pore pressure, a brittle rock formation is encouraged to fracture due to the differential pressure across the surface of the borehole;

A reduced pressure below the bit produces a downward force on the bit that increases the load on the cutters, improving their cutting efficiency; and Rapidly changing pressures produce a "water hammer effect" or impulse that is transmitted to the drill bit and its cutters to also improve the cutting efficiency and fracturing of the rock by the bit.

Other benefits of using a pulse valve are described in commonly assigned U.S. Pat. No. 6,237,701 and include:

Increased rate of drill bit penetration;
Early identification of potential gas kicks; and
Downhole seismic signal generation while drilling.

Additional applications of the negative pressure pulse in borehole applications other than drilling include:

De-scaling of tubulars; and
Formation cleaning.

Further, the design of this novel pulse valve and its enhanced functionality enables it to be used for the following exemplary purposes: (1) the use of long duration pulses to pull a coil into a long deviated well; (2) the use of long duration pulses to enhance chemical placement in a long section of wellbore; (3) the use of long duration pulses to remove formation damage from the formation surrounding the wellbore; (4) the use of the hydraulic pulse valve with a down hole motor to enhance weight transfer to a milling or drilling bit in a long deviated well; (5) the use of the pulse valve to enhance weight transfer with other down hole tools such as latches and valve actuators; (6) the use of the pulse valve to increase the movement of sand in a deviated well and to reduce the time needed to clean sand from a well; (7) the use of the pulse valve to enhance the placement of gravel packs in a long extended well; and, (8) the use of the pulse valve to increase the effectiveness of jetting tools for removal of hard fill and scale.

This application hereby specifically incorporates by reference the disclosures and drawings of each commonly assigned issued patent identified herein.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIGS. 1A, 1B, 1C, and 1D are identical plan views of the bottom of an exemplary pulse valve in accord with the present novel approach;

Figure 9A:
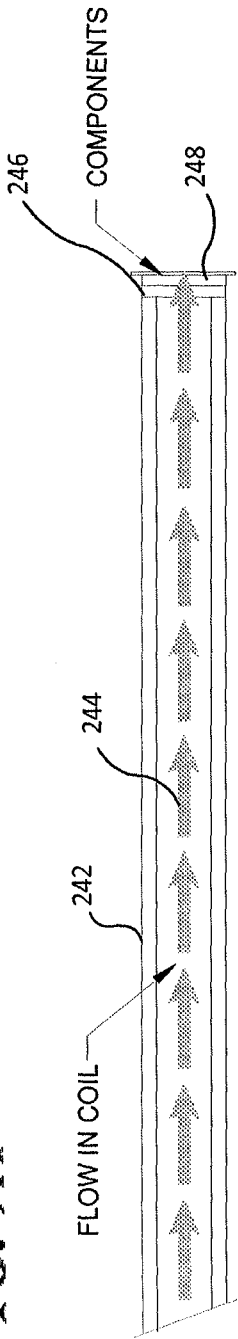
Figure 9B:
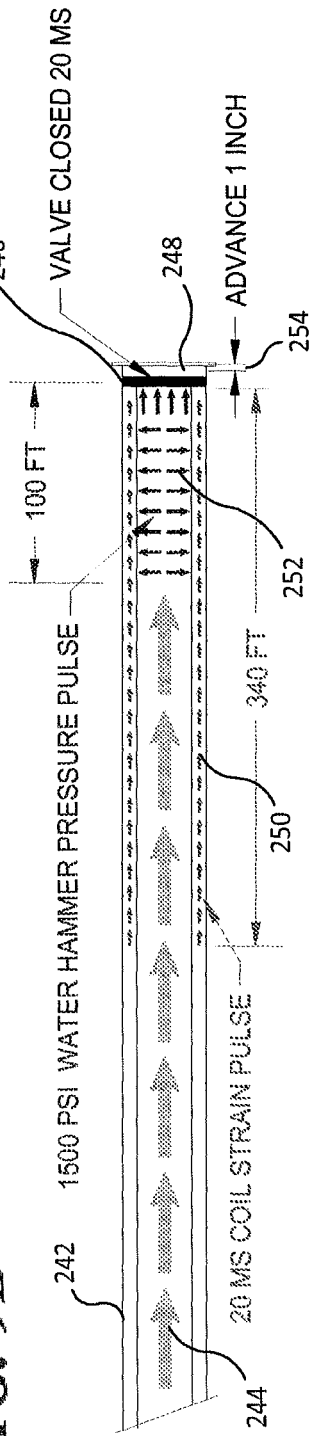
Figure 9C:
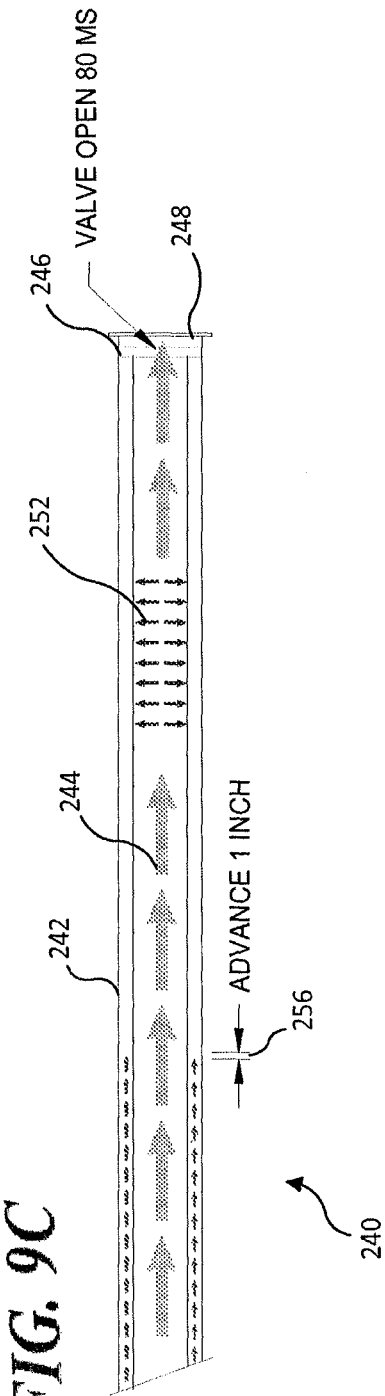

FIGS. 9A, 9B, and 9C are three schematic views showing how pressure pulses produced by the pulse valve are used to pull a conduit into a generally horizontal borehole; and FIGS. 10A, 10B, and 10C are three schematic views illustrating how pressure pulses are used to force acid conveyed through a conduit into a formation surrounding a well through which the conduit extends.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Figure 1A:
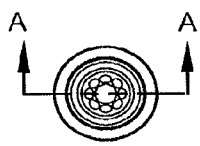
Figure 1B:
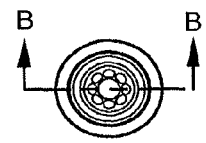
Figure 2A:
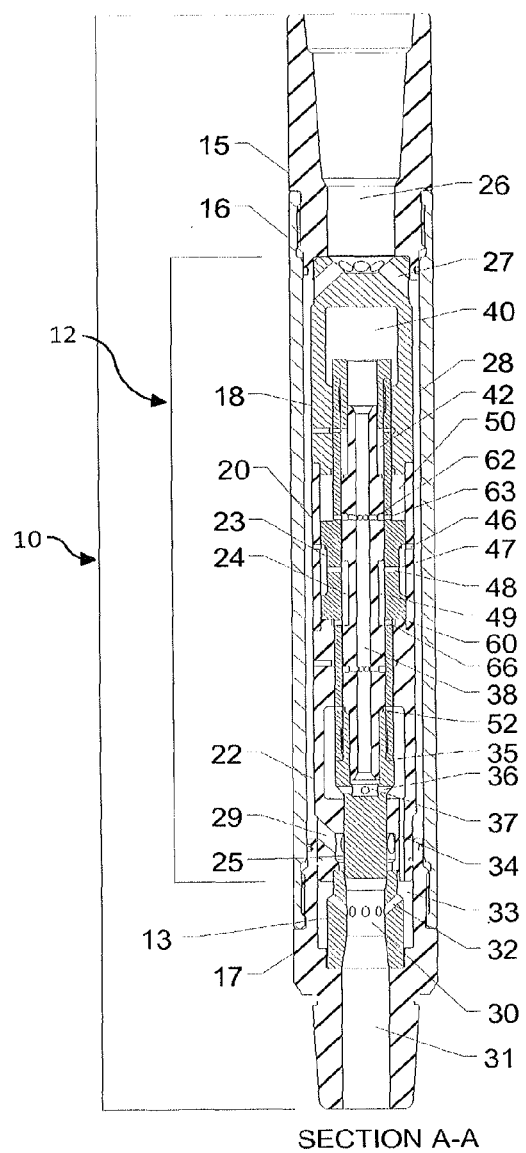
FIG. 2A is a longitudinal cross-sectional view of the pulse valve taken along section lines A-A in FIG. 1A, wherein the pulse valve is shown in a closed state, with a pilot shown at its lowest position within a piston assembly of the pulse valve.

The characteristics and operation of the hydraulic pulse valve are best understood by examining its four sequential operational steps as illustrated in FIGS. 2A through 2D. A cross-sectional view of an exemplary hydraulic pulse valve with the poppet closed taken along section line A-A of FIG. 1A is illustrated in FIG. 2A. As shown therein, the valve basically includes a body 10, a valve cartridge 12, and a poppet seat 13. Body 10 includes an inlet adapter 15, a housing 16, and an outlet adapter 17. The inlet and outlet adapters have threaded ends for serial connection into the bottomhole assembly as a part of a string of downhole tools. Valve cartridge 12 includes both stationary components and moving components. The stationary components include an upper manifold 18, a cylinder 20, and a lower manifold 22. The stationary components of the cartridge assembly and poppet seat 13 are clamped tight axially between inlet adapter 15 and outlet adapter 17. The moving parts of the cartridge include a piston assembly 23, and a pilot 24. The piston assembly moves axially between upper and lower shoulders inside the cartridge assembly. Major and minor outer cylindrical surfaces of the piston form slidable seals against the internal bores of the cartridge. Variable upper annular volume 50 and variable lower annular volume 60 are thus created between the piston and cartridge shoulders. The pilot moves axially between upper and lower shoulders within the piston assembly. Major and minor outer cylindrical surfaces of the pilot form slidable seals against the bores of the piston. Variable upper annular volume 42 and variable lower annular volume 52 are thus created between the pilot and piston shoulders. The piston and cartridge assemblies may comprise several pieces to facilitate efficient and low cost manufacturing of the pulse valve, generally as described in U.S. Pat. No. 7,139,219. The piston and cartridge assemblies shown in FIGS. 2A through 2D have been simplified to facilitate understanding of the function and operation of the hydraulic pulse valve. At the lower end of the piston assembly is a poppet 25 that moves in and out of poppet seat 13 to open or close the pulse valve in response to changing pressure conditions within the pulse valve and changes in the path of fluid communication within the pulse valve caused by the moving pilot.

Figure 2B:
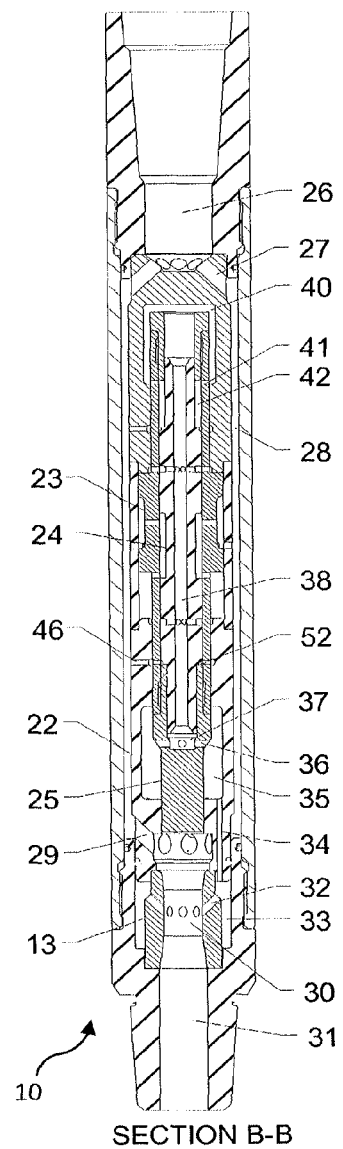
FIG. 2B is a longitudinal cross-sectional view of the pulse valve taken along section lines B-B in FIG. 1B, wherein the pulse valve is shown in an open state, with the pilot shown at its lowest position within the piston assembly of the pulse valve.
Figure 1C:
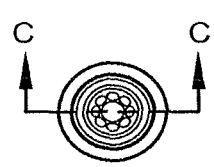
Figure 1D:
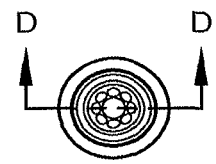

The hydraulic pulse valve is supplied with fluid from tubing connected at inlet adaptor 15. The fluid flows though a passage 26 in the center of inlet adapter 15, through passages 27 in upper manifold 18, and into an annular volume 28 that is disposed between housing 16 and valve cartridge 12. Fluid flow is directed to the inside of lower manifold 22 though ports 29. In FIG. 2A, the pulse valve is shown in the closed position, with poppet 25 obstructing the fluid flow through a Venturi flow restriction 30 in poppet seat 13, thus preventing fluid from flowing into outlet passage 31 in lower adaptor 17. Poppet seat 13 further incorporates multiple flow passages 32, which communicate with annular volume 33 and flow passages 34 in lower manifold 22 and volume 35 between piston assembly 23 and the lower manifold. Flow passages 36 in poppet 25 communicate with an inside volume 37 of piston assembly 23 and through a central passage 38 in pilot 24. When the poppet is in the closed position, as shown in FIG. 2A, there is little or no flow downstream of the pulse valve, and the pressure is relatively low in flow restriction 30, outlet passage 31 and in tools disposed in the string below and distal of the pulse valve. This low pressure is communicated through passages 32 into annular volume 33, and through passages 34 into annular volume 35. The low pressure is further communicated through passages 36 into volume 37 and into central passage 38. In this pilot position, ports 62 in pilot are aligned with ports 63 in the piston assembly, thus communicating low pressure into upper variable volume 50. Meanwhile, high pressure in annular passage 28 is transmitted through radial ports 46 in cylinder 20 to volume 47 and through radial ports 48 in piston to volume 49 in the pilot. In this pilot position, lower variable volume 60 is exposed to the high pressure in annular volume 49 through radial ports 66 in the piston. The large differential pressure between variable volumes 50 and 60 causes piston assembly 23 (including poppet 25 and pilot 24) to move upwardly and open the pulse valve, to enable fluid flow through outlet passage 31, as illustrated in FIG. 2B. The arrangement of ports and the principle of operation of the moving parts are similar to those described in U.S. Pat. No. 7,139,219.

FIG. 2B shows the hydraulic pulse valve with the poppet open, and pilot 24 still in the lowest position within piston assembly 23. Since the poppet is open, fluid is now able to flow from inlet passage 26 into outlet passage 31 through ports 27, annular passage 28, and ports 29. Accordingly, the differential pressure (i.e., the difference between the fluid pressure at inlet passage 26 and outlet passage 31) is relatively low and is only the result of the resistance to fluid flow through the internal passages and openings of the pulse valve, such as annular passage 28 and ports 29 and 27. However, flow restriction 30 in poppet seat 13 is shaped like a Venturi, causing the fluid flow to accelerate through the throat of the poppet seat. The static pressure in the throat of the Venturi is lower than the pressure in annular passage 28, due to well known hydrodynamic principles, as taught by Daniel Bernoulli in his book Hydrodynamica (1738). It is this pressure differential that causes the elements of pilot 24 and piston assembly 23 (including poppet 25) to move and reclose the valve. Without the Venturi effect of the flow restriction in the throat of the poppet seat, the differential pressure available when the pulse valve is open would be too small to reliably move the piston and pilot. The low pressure caused by the Venturi effect is communicated through multiple flow passages 32, into annular volume 33, and through flow passages 34 in lower manifold 22 into volume 35. Flow passages 36 in poppet 25 communicate the lower pressure into volume 37 of piston assembly 23, and then into central passage 38 in pilot 24. Since central passage 38 is in fluid communication with an upper volume 40, the low pressure is also communicated from upper volume 40 through radial passages 41 into annular volume 42, which is disposed between an upper annular shoulder of pilot 24 and an upper internal annular shoulder of piston assembly 23. Higher pressure is conveyed through passages 46 from annular passage 28 into closed variable volume 52. The difference in pressure between variable volumes 42 and 52 acts on the pilot to move it upwardly, so that volume 52 opens, as seen in FIG. 2C.

Figure 2C:
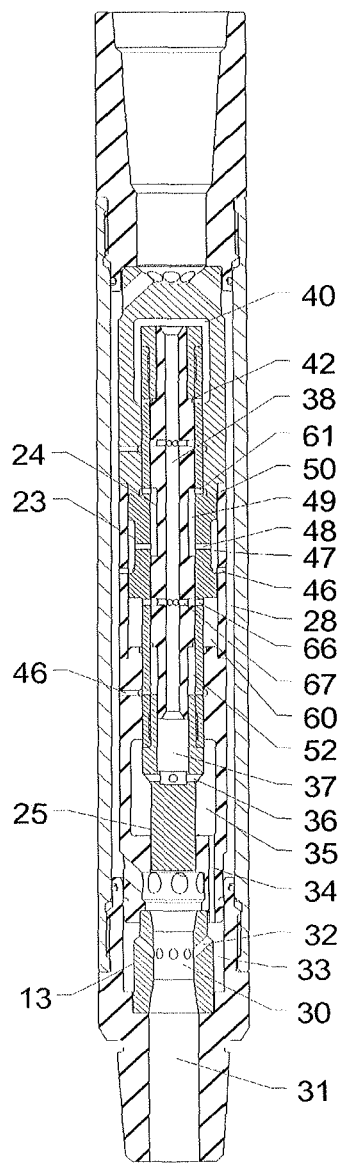
FIG. 2C is a longitudinal cross-sectional view of the pulse valve taken along section lines C-C in FIG. 1C, wherein the pulse valve is shown in an open state, with the pilot shown at its highest position within the piston assembly of the pulse valve.

FIG. 2C shows the hydraulic pulse valve with the poppet open and with the pilot in its uppermost position within the piston assembly. Since poppet 25 is open, the differential pressure drop across the pulse valve is low. And, again, there is a much lower pressure created in multiple flow passages 32 by the Venturi effect of fluid flowing through flow restriction 30, and this low pressure is conveyed through annular volume 33, flow passages 34, volume 35, flow passages 36, volume 37 and central passage 38. Central passage 38 conveys this low pressure into upper volume 40, but because pilot 24 has now moved to its uppermost position, annular volume 42 is closed. The low pressure is also conveyed from central passage 38 through ports 67 in the pilot which align with radial ports 66 in the piston and into piston lower variable volume 60. Also, the current position of pilot 24 communicates the higher pressure in annular passage 28 through a radial passages 46 into annular volume 47. Annular volume 47 communicates through radial passages 48 with annular volume 49 that is communicating through radial passages 61 to piston upper variable volume 50, which is currently closed. The differential pressure between variable volumes 50 and 60 urges the piston assembly to begin moving poppet 25 downwardly, to the closed position and at least partially block fluid flow through outlet passage 31, as illustrated in FIG. 2D.

Figure 2D:
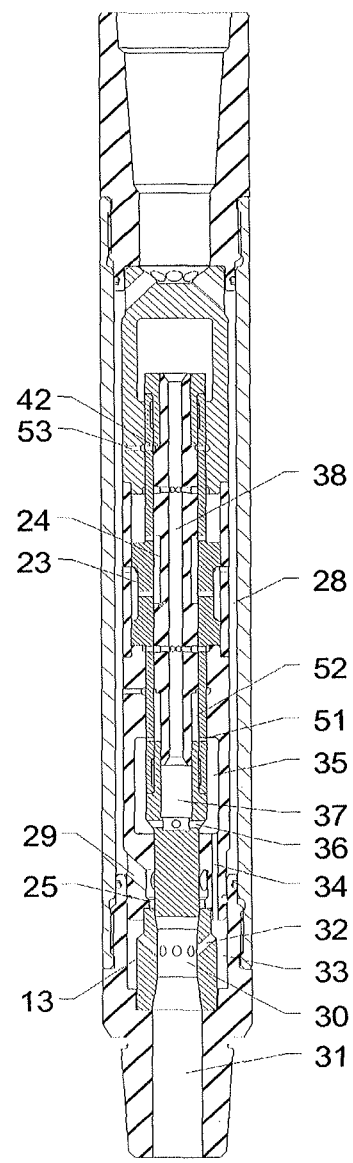
FIG. 2D is a longitudinal cross-sectional view of the pulse valve taken along section lines D-D in FIG. 1D, wherein the pulse valve is shown in the closed state, with the pilot shown at its highest position within the piston assembly of the pulse valve.

Turning now to FIG. 2D, the pulse valve is shown with poppet 25 in its lowest position within the valve body, blocking fluid from flowing from annular passage 28 through ports 29, and with pilot 24 still in its highest position within the piston assembly. Since the pulse valve is closed, the pressure in outlet passage 31 is relatively lower than the pressure in annular passage 28. The relatively lower pressure in outlet passage 31 is conveyed through multiple passages 32 to annular volume 33, flow passages 34, and into volume 35. Again, flow passages 36 in poppet 25 communicate the relatively lower pressure into volume 37 of piston assembly 23 (as shown in FIG. 2C), and then into central passage 38 in pilot 24. From volume 35, the lower pressure is conveyed through a radial passage 51 and into pilot lower variable annular volume 52. Higher pressure within annular passage 28 is conveyed through radial passage 53, into pilot upper variable annular volume 42. The differential pressure between variable volumes 52 and 42 tends to urge pilot 24 to move downwardly within piston assembly 23, to the position shown in FIG. 2A.

In one exemplary embodiment, radial passage 53 is restricted in diameter, thereby limiting the fluid flow rate into pilot upper variable volume 42 and slowing the motion of pilot 24. Since poppet 25 is closed during this time, the flow restriction increases the duration of the pressure pulses that are generated by the pulse valve.

The movement of piston assembly 23 and pilot 24 within the valve body then repeats in sequence, as shown in FIGS. 2A-2D, producing a pressure pulse each time that poppet 25 closes the pulse valve, stopping fluid flow though outlet passage 31.

To summarize, from the configuration of FIG. 2A in which poppet 25 is seated within poppet seat 13, interrupting fluid flow through the pulse valve and pilot 25 is disposed at its lowest point within piston assembly, the relatively higher pressure with annular passage 28 (compared to the lower pressure in inlet passage 31) forces the poppet to move upwardly out of poppet seat 13, and opens the pulse valve to fluid flow, as shown in FIG. 2B. The Venturi effect produced by fluid flowing through flow restriction 30 in poppet seat 13 produces a relatively lower pressure, so that the pressure in annular passage 28 can be applied to move pilot 24 upwardly to the top of the valve assembly interior, as shown in FIG. 2C. Then, the pressure in annular passage 28, which is greater than the low pressure caused by the Venturi effect of fluid flowing through throat 30 in poppet seat 13, urges poppet 25 downwardly, at least partially blocking fluid flow through poppet seat 13, as shown in FIG. 2D. For each change of position of pilot 24 and poppet 25, it is the differential pressure in the various passages and volumes of the valve assembly that provide the fluid pressure force to move the poppet and pilot components, thereby changing the flow paths through the valve assembly, to repetitively produce pressure pulses.

Discharging the flow used to move the piston and pilot into flow restriction 30 rather than overboard, as in a previous design, has a substantial benefit. Specifically, a pressure drop through tools connected below or distal of the pulse valve has no effect on the differential pressure across the pulse valve. The pulse frequency of the pulse valve is thus controlled by the fluid flow rate through the pulse valve rather than by upstream pressure. The fluid flow rate can be controlled by controlling the speed/volume of the pump that supplies pressurized fluid down hole. A higher flow rate produces a higher pulse frequency, so increasing the speed of the pump and/or its volumetric rate can increase the pulse frequency. Furthermore, a range of tools may be attached to the lower adaptor of the pulse valve, depending on the type of work to be done, and the application in which the pulse valve is to be employed.

It should be understood that the flow rate and any bypass fluid flow path (such as the optional bypass grooves discussed below) control the pressure pulse amplitude.

Figure 6A:
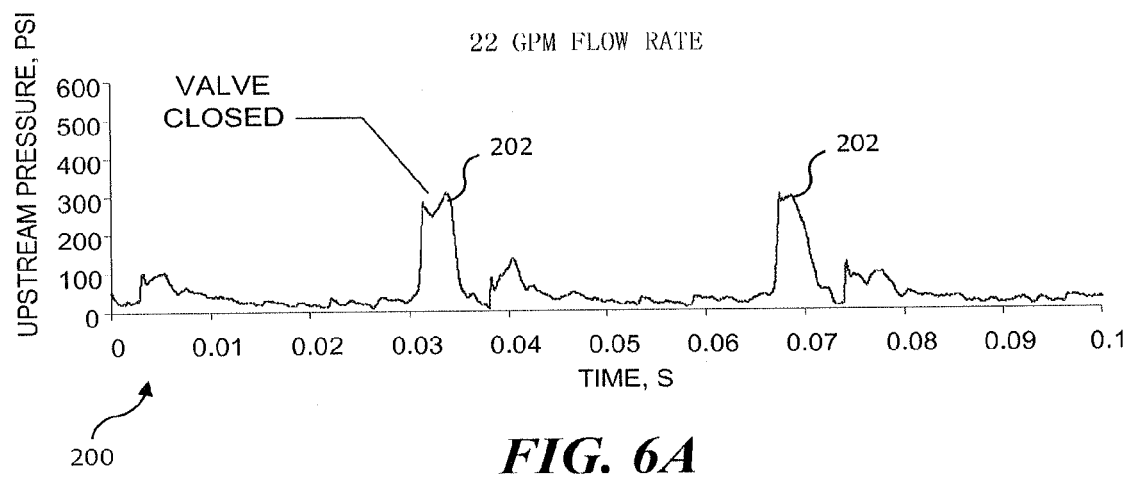
FIG. 6A is a graph illustrating exemplary upstream pressure pulses produced by the pulse valve at a relatively low flow rate of fluid through the pulse valve.
Figure 6B:
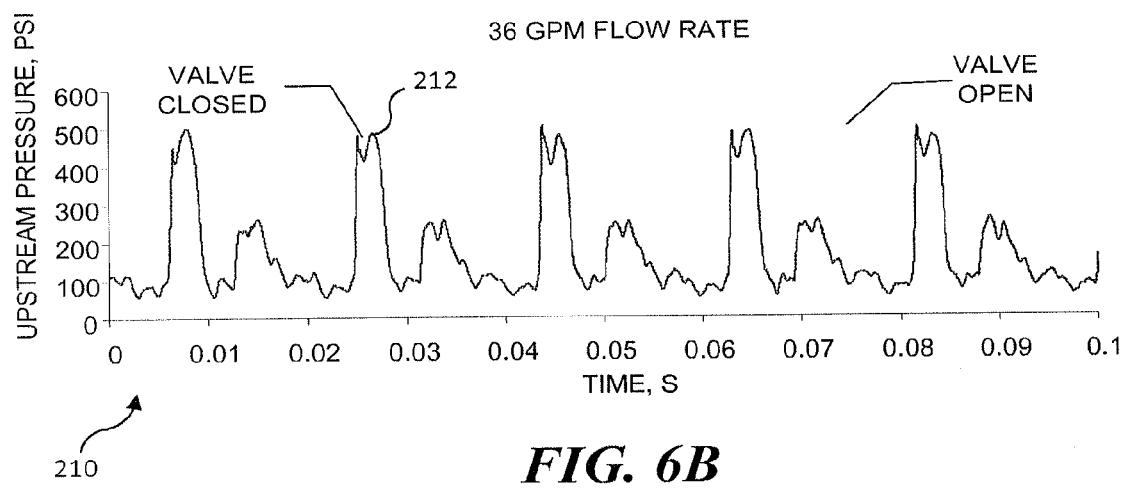
FIG. 6B is a graph illustrating exemplary pressure pulses produced at a relatively higher flow rate, compared to that of FIG. 6A, indicating that increasing the flow rate increases the pulse frequency in a linear predictable fashion.

For example, FIG. 6A is a graph 200 that shows exemplary upstream pressure pulses 202 produced each time that the pulse valve closes when there is a relatively low flow rate (i.e., about 22 gpm) of fluid through the pulse valve. In contrast, FIG. 6B is a graph 210 that shows pressure pulses 212 produced when the pulse valve closes, for a higher flow rate (i.e., about 36 gpm) than that of FIG. 6A. The lower amplitude pulses are artifacts of the experiment, representing reflections of the primary pulse in the test loop. A comparison of the pulses in FIGS. 6A and 6B clearly shows that increasing the flow rate increases the pulse frequency in a linear predictable fashion.

Figure 7:
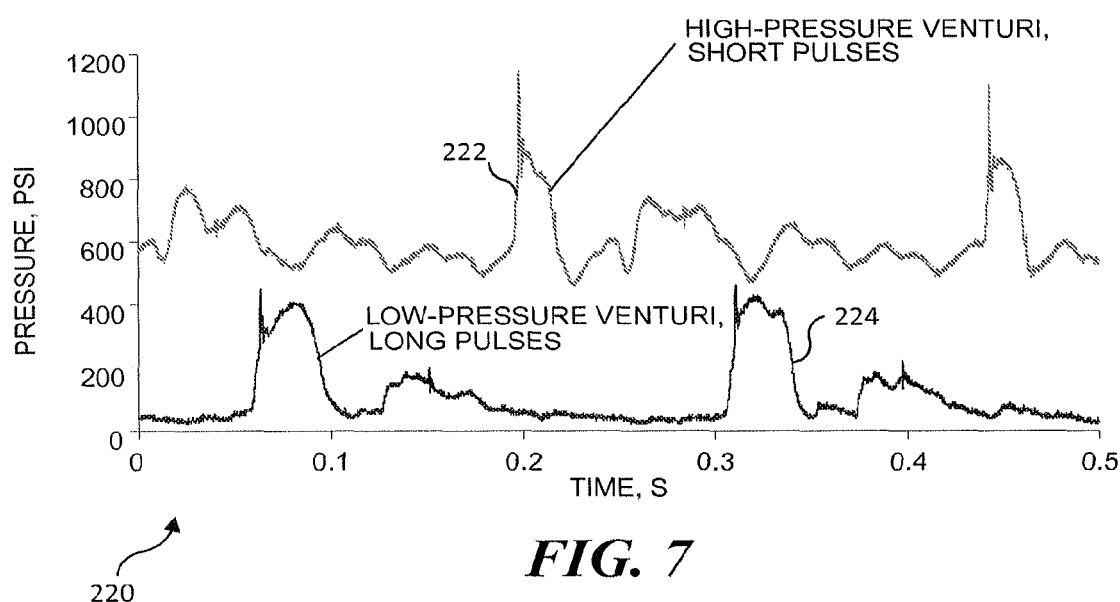
FIG. 7 is a graph illustrating an effect of Venturi port size on pressure pulse width produced by the pulse valve, wherein a smaller Venturi port causes a higher pressure differential, resulting in a shorter pulse width, while a larger Venturi port causes a lower pressure differential and longer pulse width, and the cycle rate remains relatively unchanged.

FIG. 7 is a graph 220 that shows the effect of the Venturi port size on the pulse width. A smaller Venturi port causes a higher pressure differential which results in a shorter pulse width 222. A larger Venturi port results in a lower pressure differential and longer pulse width 224. The cycle rate remains relatively unchanged.

Figure 8:
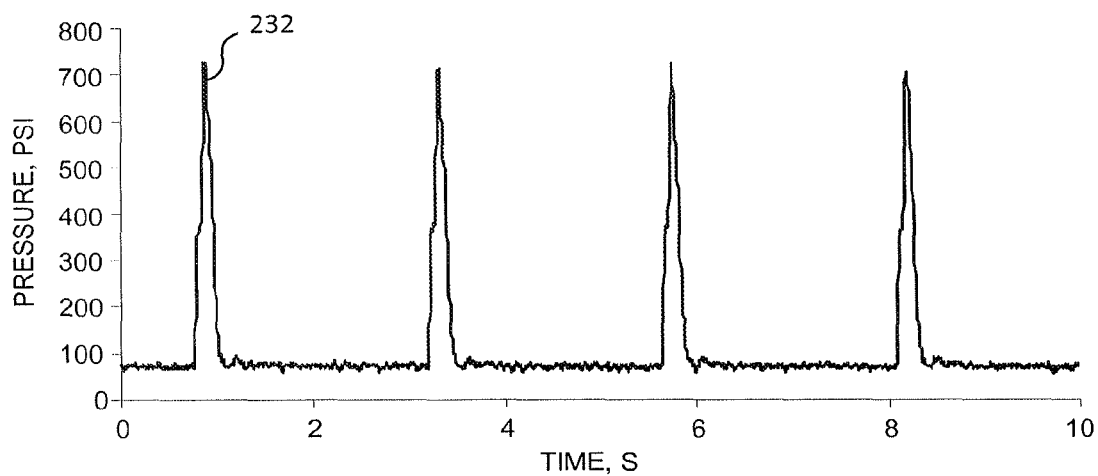
FIG. 8 is a graph illustrating exemplary pressure pulses generated by a larger pulse valve with a relatively large Venturi port.

FIG. 8 is a graph 230 that shows exemplary pressure pulses 232 generated by a larger pulse valve, with a relatively larger Venturi port. The pulses are a close approximation to an impulse with a cycle period longer than 1 second. This type of pulse is ideal for seismic interpretation, because the travel times of seismic waves in the earth crust for formations of interest, such as oil- and gas production, are on the order of seconds. The long period energy generated by this type of cyclic impulse that is produced by the present exemplary pulse valve also propagates long distances in the earth and is ideal for pore pressure prediction.

Figure 3:
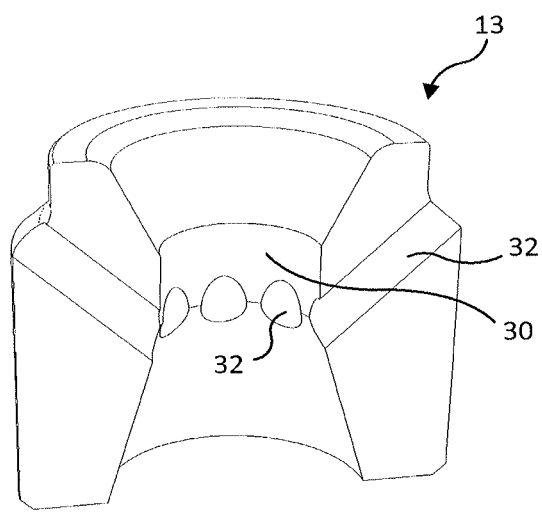
FIG. 3 is a cross-section side elevational view of an exemplary embodiment of poppet seat used in the pulse valve of FIGS. 1A-1D, and 2A-2D.
Figure 4:
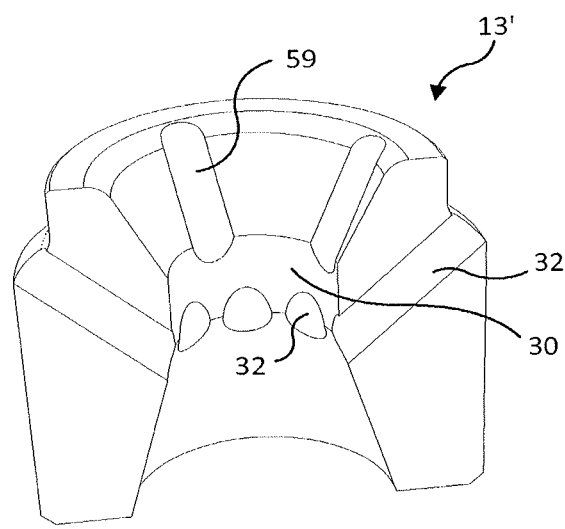
FIG. 4 is a cross-section side elevational view of an alternative exemplary embodiment of a poppet seat with grooves that is usable in the pulse valve of FIGS. 1A-1D, and 2A-2D.

FIG. 3 shows a cross-sectional view of an exemplary embodiment of poppet seat 13. FIG. 4 shows a cross-sectional view of an alternative exemplary embodiment of a poppet seat 13', which is modified compared to poppet seat 13, to include bypass grooves 59. Bypass grooves 59 prevent poppet 25 (not shown in this Figure) from completely blocking flow restriction 30 when the pulse valve is closed, which reduces the pulse amplitude, allowing a higher average fluid flow rate through the pulse valve. It will be noted by those skilled in this art that the bypass function can also be accomplished with ports instead of bypass grooves 59, or by preventing poppet 25 from fully contacting poppet seat 13', thereby creating an annular gap between the two.

Figure 5:
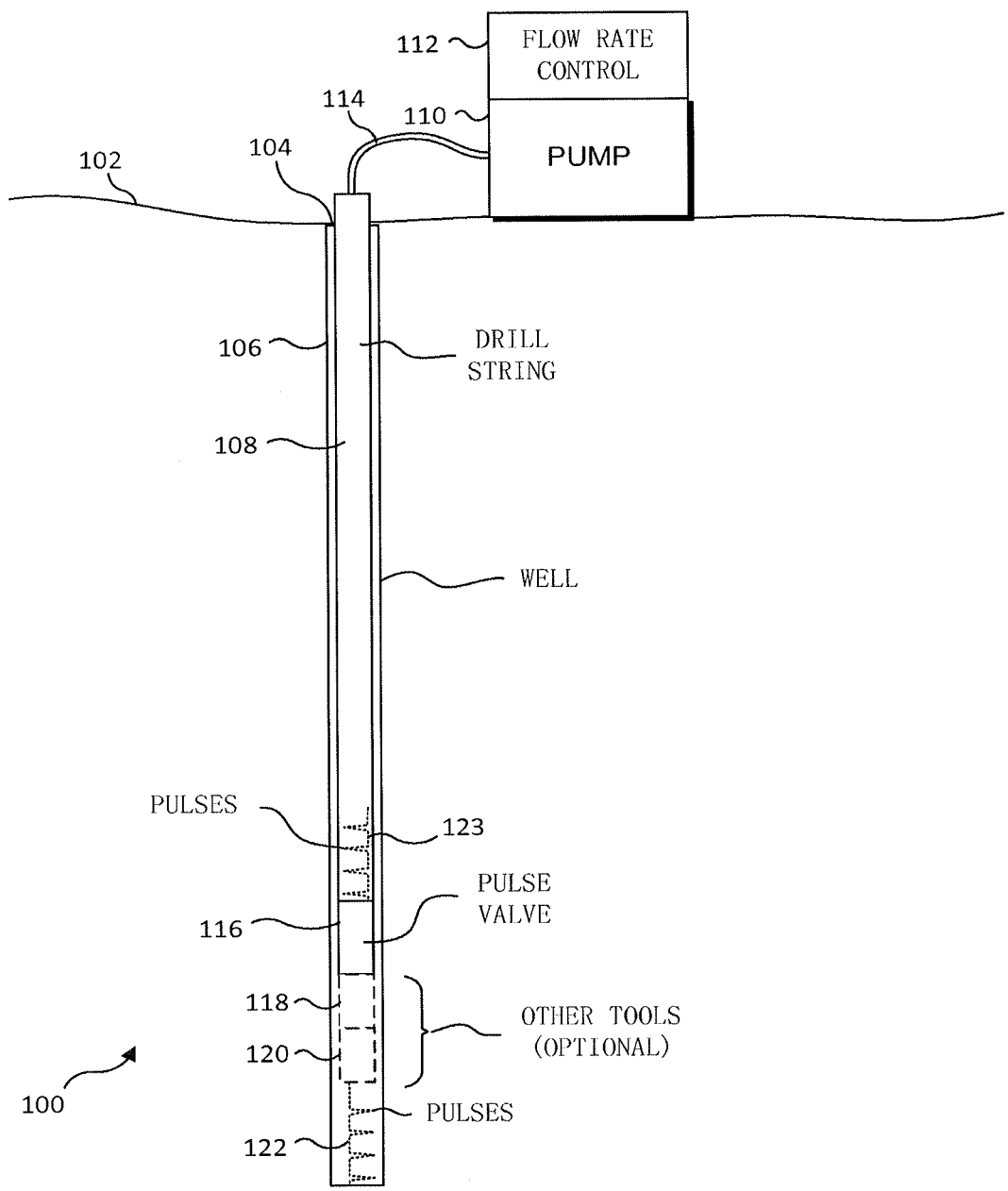
FIG. 5 is a schematic cross-sectional view of a borehole and drill string in which the exemplary pulse valve described herein is installed.

FIG. 5 is a schematic cross-sectional view 100, illustrating a ground surface 102 on which a well-head 104 of a well or borehole 106 is disposed. A conduit 108 extends from well-head 104 down into borehole 106. On surface 102 is disposed a pump 110 that is controlled by a flow rate control 112, which can vary the speed of the pump to achieve a desired flow rate of fluid into the conduit through a fluid line 114. The fluid circulated under pressure into the conduit is a relatively incompressible liquid, such as drilling mud or water, although other liquids might be used, including a mixture of a liquid and a gas, depending upon the application and its requirements. The conduit may be continuous coiled tubing or jointed tubing. Near the distal end of conduit 108 is disposed a pulse valve 116, which is optionally part of serial string of tools and is configured and functions like the exemplary embodiment described above. Optionally, below (or above) pulse valve 116 is disposed one or more other tools 118 and/or 120 which may be employed. The specific tool(s) and function of pulse valve 116 depend on the application for which the drill string and pulse valve are being used. Examples of the well-known applications of pulse valves are listed above. Pulse valve 116 is shown (schematically) discharging into a 106 that is open to the surface, producing negative pressure pulses 122 that propagate into the borehole and the surrounding earth, and positive pressure pulses 123 that propagate inside conduit 108, whenever the valve closes Borehole 106 may also be closed so that all fluid is forced into the formation, in which case, positive pressure pulses are produced in the borehole when the valve opens The design and operation of pulse valve 116 so as to use the Venturi effect to develop a lower pressure for operating the pulse valve and to avoid dumping fluid directly into the borehole from the sides of the pulse valve (as has been done in earlier designs described in the above-noted commonly assigned patents) provide several advantages. Since the present novel design does not even include openings in the side of the pulse valve body that can be used to dump pressurized fluid into the borehole, all of the pressurized fluid entering the inlet of pulse valve exits through the outlet and remains available for application to downstream tools. Pulse valve 116 can also produce a relatively longer duration pressure pulse, which increases the impulse energy and effective range of the pressure pulses. The longer pulse duration is the direct result of reduced differential pressure as discussed above. The use of a flow restriction in flow passage 53 further increases the pulse width by slowing the flow of the pressurized fluid that moves the pilot. The length of the travel of the pilot and poppet may also be increased to increase the pulse duration; however, this approach leads to increased cost for the pulse valve, since the increased travel length requires longer parts.

A novel aspect of the present pulse valve is its use of the Venturi effect arising from the flow of fluid through the restricted throat of the poppet seat to provide a differential pressure used to operate the pulse valve, i.e., to move the pilot between the upper and lower positions, and to close the pulse valve by moving the poppet into its closed position within the poppet seat. In addition, the cycle rate or pulse frequency of the pulse valve can readily be reduced by reducing the flow rate of the fluid through the pulse valve, to enable seismic interpretation and pore pressure prediction when the tools are used as a seismic source. Further, it is possible to control the impulse amplitude of the pressure impulses produced by the pulse valve by increasing or decreasing the size of the bypass ports, while maintaining pulse duration and cycle rate.

FIGS. 9A-9C include three schematic views 240 that illustrate how an exemplary pulse valve 246 as described above may be used as an engine to pull a long length of tubing 242 having components 248, such as a motor and mill, jetting nozzle, logging tool, or perforating gun array at its distal end, into a generally horizontal well. When a fluid flow 244 in tubing 242 is interrupted by the pulse valve, a tensile load is introduced into the tubing by pulses 252, causing it to stretch. In a typical configuration, the pulse duration is on the order of 20 ms, which is the time that the pulse valve is closed, while the period between pulses is about 80 ms, or the interval during which the pulse valve is open. When the tubing stretches, as indicated by reference numeral 250, the distal end of the tubing moves forward within the well, e.g., by about one inch, as indicated by a reference number 254. When the pulse valve opens again, the hydraulic pulse engine stops moving, but strain pulses 252 propagate up the tubing, causing the entire tubing string to again move forward a small amount, as indicated by reference numeral 256. In a typical application, the motion of the tubing string is on the order of one-inch per pulse, as indicated. The upper end of the tubing is connected to a hoist system in the case of jointed tubing, or to a heavy reel of coiled tubing that constantly feeds the tubing into the well (neither shown). This surface system is massive and absorbs the strain energy pulse, so that it is not reflected back down the well.

FIGS. 10A-10C include three schematic illustrations 270 that show how an exemplary pulse valve 280, which is configured and operates as discussed above, may be used to enhance the placement of chemicals, such as an acid 278 that is flowing through tubing 272. The acid is thus forced into a formation 276 surrounding a wellbore 274. In this application of the pulse valve, the upper end of the wellbore is closed so that all of the fluid (e.g., the acid) is forced into the surrounding formation by pressure pulses 284. Interrupting the flow of fluid generates an upstream pressure pulse 282 that stores considerable energy. When the pressure pulse is released, the flow of fluid into the wellbore is substantially greater than the average flow rate of the fluid being pumped, which results in cyclic surging of the flow of the fluid into the formation. The pulse valve thus aids acid placement in the surrounding formation. This same approach can also be used for forcing other types of fluid into the formation around a well.

In the event that the wellbore is open to allow circulation, the surge of fluid introduced into the well causes a surge in the flow velocity in the annulus around the drill string. This flow surge can be used to enhance the transport of sand or other debris out of the horizontal and inclined sections of the wellbore.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention claimed is:

1. A pulse valve for producing pressure pulses within a conduit, comprising an elongate housing that includes:
   (a) an internal passage for conveying a pressurized fluid between an inlet disposed on one end of the housing and an outlet disposed on an opposite end of the housing, the inlet being configured to couple to a source of the pressurized fluid, and the outlet configured to convey the pressurized fluid;
   (b) a poppet seat disposed adjacent to said outlet of said housing, the poppet seat including a constricted throat and at least one port disposed in the throat, said port being coupled in fluid communication with a one or more fluid passages axially spaced from said poppet seat;
   (c) a valve assembly disposed within the elongate housing and axially spaced from said poppet seat, the valve assembly including:
      (i) a poppet that is reciprocally movable between a closed position in which it at least partially blocks pressurized fluid from flowing through the poppet seat, and an open position in which the pressurized fluid flows through the throat of the poppet seat;
      (ii) a pilot that is disposed within the poppet and reciprocates between a disparate first and second positions to alter fluid communication paths within the valve assembly; and
      (iii) a plurality of fluid passages, each of which is intermittently configured in fluid communication with said port disposed in the throat of said poppet seat, the poppet moving in response to differential pressures developed in the valve assembly, including a differential pressure between a higher pressure of the pressurized fluid within the internal passage and a relatively lower pressure in said port in the throat while the poppet is in the open position, wherein the relatively lower pressure is produced in said port by a Venturi effect as the pressurized fluid flows through the throat of the poppet seat, and the relatively lower pressure is communicated from front said port to one or more of the fluid passages located within the axially spaced valve assembly: a pressure pulse being produced each time that the poppet moves to the closed position.

2. The pulse valve of claim 1, wherein the movement of the pilot between the first and second positions reconfigures fluid communication paths in the valve assembly.

3. The pulse valve of claim 1, wherein the movement of the poppet between the open and closed positions causes changes in fluid communication paths in the valve assembly.

4. The pulse valve of claim 1, wherein the poppet seat includes a bypass path that enables some pressurized fluid to flow through the outlet of the pulse valve when the poppet is in the closed position.

5. The pulse valve of claim 4, wherein the bypass path comprises one or more grooves in the poppet seat that are in fluid communication with the internal passage conveying pressurized fluid and which are not sealed by the poppet when the poppet is in the closed position.

6. The pulse valve of claim 4, wherein the bypass path comprises one or more ports in the poppet seat that are in fluid communication with the internal passage conveying pressurized fluid and which are not sealed by the poppet when the poppet is in the closed position.

7. The pulse valve of claim 4, wherein the bypass path comprises an annular opening between the poppet and the poppet seat that is in fluid communication with the internal passage and which is not sealed by the poppet when the poppet is in the closed position.

8. The pulse valve of claim 1, wherein when the poppet is closed, a differential pressure is produced between a lower pressure in the outlet and a higher pressure in said internal passage in which the pressurized fluid is conveyed, said lower pressure being communicated from said port to one or more fluid passages in the axially spaced valve assembly.

9. The pulse valve of claim 1, wherein the elongate housing is configured so that all of the pressurized fluid entering the inlet flows through the outlet.

10. The pulse valve of claim 1, wherein the elongate housing is configured to discharge at least some of the pressurized fluid through a port in the housing sidewall into a borehole surrounding the housing.

11. A pulse valve for producing pressure pulses, comprising:
   (a) an elongate hollow housing having a distal end and a proximal end, the proximal end having an inlet passage configured to receive a pressurized fluid, and the distal end having an outlet passage configured to convey the pressurized fluid;
   (b) a poppet seat disposed within the housing, adjacent to the outlet passage, the poppet seat including a throat having a smaller cross-sectional size than the outlet passage, causing the fluid flowing through the throat when the pulse valve is open to experience a greater velocity than the fluid flowing through the outlet passage, the poppet seat including a plurality of ports disposed at spaced apart intervals around the throat;
   (c) a valve assembly disposed within the housing, the valve assembly including a plurality of fluid passages, and a poppet that is movable between a closed position in which the poppet is positioned within the poppet seat to at least partially block pressurized fluid flow through the throat of the poppet seat, and an open position in which the poppet is withdrawn from the poppet seat so that the pressurized fluid flows through the throat of the poppet seat and through the outlet passage, wherein the pressurized fluid flowing through the throat of the poppet seat produces a lower pressure within the plurality of ports, compared to a pressure of the pressurized fluid at the inlet passage and the outlet passage, as a result of a Venturi effect, movement of the poppet between the closed position and the open position being caused by pressure differences within the valve assembly; and
   (d) a pilot disposed coaxially within the poppet, the pilot configured to move in conjunction with the poppet and to continue moving when the poppet reaches the open and closed position, movement of the pilot between the two spaced-apart positions and of the poppet between the closed position and the open position changing fluid paths through the valve assembly, wherein application of the pressure differences in the valve assembly at different points causes movement of the poppet and the pilot in a repetitive sequence, the pulse valve producing a pressure pulse each time that the poppet moves to its closed position in the poppet seat.

12. The pulse valve of claim 11, wherein the poppet seat includes at least one bypass fluid path that permits a reduced amount of pressurized fluid to flow through the throat of the poppet seat when the poppet is in the closed position, compared to when the poppet is in the open position, the bypass fluid path reducing an amplitude of the pressure pulse produced when the poppet moves to the closed position, compared to the amplitude of the pressure pulse that would be produced if the poppet completely blocked the flow of pressurized fluid through the throat of the poppet seat.

13. The pulse valve of claim 12, wherein the bypass fluid path comprises one selected from the group consisting of:
   (a) one or more bypass grooves formed in the poppet seat and which are in fluid communication with the outlet passage, even when the poppet is in the closed position;
   (b) one or more ports formed in the poppet seat and which are in fluid communication with the outlet passage, even when the poppet is in the closed position; and
   (c) a gap between the poppet and the poppet seat that remains open when the poppet is in the closed position, to enable the reduced amount of pressurized fluid to flow through the poppet seat and the outlet passage.

14. The pulse valve of claim 11, wherein an annular passage formed between an interior of the housing and an exterior of the valve assembly comprises a pressurized fluid path through the pulse valve used to convey pressurized fluid from the inlet passage to the outlet passage when the poppet is in the open position.

15. The pulse valve of claim 14, further comprising elements within the valve assembly that are fixed relative to the poppet, at least one element that is fixed limiting travel of the poppet as the poppet moves between its open and closed positions.

16. The pulse valve of claim 15, wherein a fluid passage within at least one element that is fixed, couples the annular passage conveying pressurized fluid to a passage opened by the pilot when the pilot has moved to one of the disparate positions, so that the pressurized fluid produces a force to move the poppet.

17. The pulse valve of claim 14, further comprising a plurality of ports formed within a portion of the valve assembly in fluid communication with the annular passage comprising the pressurized fluid path, so that when the poppet is in the closed position, the poppet at least partially blocks the flow of the pressurized fluid from the plurality of ports into the throat of the poppet seat.

18. The pulse valve of claim 11, wherein another differential pressure used to move the poppet when the poppet is in the closed position results from a lower pressure in the outlet passage, because the flow of pressurized fluid into the outlet passage has been at least partially blocked, compared to the higher pressure of the pressurized fluid.

19. The pulse valve of claim 11, wherein a cycle of the pulse valve includes the following states in sequence, but without regard to a state in which the cycle starts:
   (a) the poppet is in the closed position, and the pilot is disposed distally within the poppet;
   (b) the poppet is in the open position, and the pilot is disposed distally within the poppet;
   (c) the poppet is in the open position, and the pilot is disposed proximally within the poppet; and
   (d) the poppet is in the closed position, producing the pressure pulse, and the pilot is disposed proximally within the poppet.

20. The pulse valve of claim 11, wherein the elongate housing is configured to discharge at least some of the pressurized fluid through a port in the housing sidewall into a borehole surrounding the housing.

21. A method for producing pressure pulses, comprising the steps of:
   (a) supplying a pressurized fluid through a conduit;
   (b) using a flow of the pressurized fluid through a restricted throat coupled in fluid communication with the conduit to develop a first differential pressure in one or more passages opening into the restricted throat, wherein the first differential pressure results from a lower pressure in the one or more passages compared to a pressure of the pressurized fluid, the lower pressure being due to a Venturi effect as the pressurized fluid flow velocity increases through the restricted throat and past the one or more passages;
   (c) communicating the lower pressure to a fluid passage located in a valve assembly that is axially spaced from the restricted throat;
   (d) using the first differential pressure to move a first element located within the valve assembly from an open position to a closed position, the closed position of the first element at least partially blocking the flow of pressurized fluid through the conduit; and
   (e) discharging at least some of the pressurized fluid through a port in the housing sidewall into a borehole surrounding the housing.

22. The method of claim 21, further comprising the step of using a second differential pressure for moving the first element from the closed position to the open position, the second differential pressure corresponding to a difference between a pressure in the conduit distal of where the flow of the pressurized fluid through the conduit is at least partially blocked by the first element, and the pressure of the pressurized fluid proximal of where the first element is at least partially blocking the flow.

23. The method of claim 21, further comprising the step of controlling a pulse rate for the pressure pulses produced when the first element at least partially blocks the flow of pressurized fluid through the conduit, by controlling the flow rate of pressurized fluid into the conduit.

24. The method of claim 23, wherein the step of controlling the flow rate of the pressurized fluid into the conduit comprises the step of controlling a speed of a pump that circulates the pressurized fluid into the conduit.

25. The method of claim 21, further comprising the step of providing a bypass fluid path to enable a portion of the pressurized fluid to flow past the first element when the first element is in the closed position.

26. The method of claim 25, further comprising the step of controlling an amplitude of the pressure pulse by controlling an amount of pressurized fluid flowing through the bypass path when the first element is in the closed position.

27. The method of claim 25, wherein the step of providing the bypass fluid path comprises the step of providing one or more grooves in a valve seat into which the first element moves when in the closed position, the one or more grooves conveying the pressurized fluid past the first element.

28. The method of claim 25, wherein the step of providing the bypass fluid path comprises the step of providing one or more passages that bypass a valve seat into which the first element moves when in the closed position, the one or more passages conveying the pressurized fluid past the first element.

29. The method of claim 25, wherein the step of providing the bypass fluid path comprises the step of providing a gap between the first element and a valve seat into which the first element moves when in the closed position, the gap enabling the pressurized fluid to flow through the conduit at a reduced rate compared to when the first element is in the open position.

30. The method of claim 21, further comprising the step of employing the pressure pulse to stretch the conduit through which the pressurized fluid is supplied when the flow of pressurized fluid is at least partially interrupted, for advancing the conduit through a borehole that is generally horizontal.

31. The method of claim 30, further comprising the step of using strain pulses that propagate through the conduit produced when the first element moves to the open position, for further advancing the conduit forward through the borehole.

32. The method of claim 21, further comprising the step of using the pressure pulse produced when the first element moves to the open position for forcing the pressurized fluid conveyed through the conduit into a formation surrounding a well through which the conduit extends.

33. The method of claim 32, further comprising the step of ensuring that the upper end of the wellbore is closed, thereby producing a cyclic surge within a borehole surrounding the conduit when the first element moves to the open position, for further forcing the pressurized fluid into the formation surrounding the well.

34. The method of claim 21, further comprising the step of ensuring that the upper end of the wellbore is open, thereby producing a cyclic surge in an annulus between the conduit and a borehole, for enhancing a transport of debris out of the annulus to a surface of the borehole.

35. A method for producing pressure pulses, comprising the steps of:
   (a) supplying a pressurized fluid through a conduit;
   (b) using a flow of the pressurized fluid through a restricted throat coupled in fluid communication with the conduit to develop a first differential pressure in one or more passages opening into the restricted throat, wherein the first differential pressure results from a lower pressure in the one or more passages compared to a pressure of the pressurized fluid, the lower pressure being due to a Venturi effect as the pressurized fluid flow velocity increases through the restricted throat and past the one or more passages;
   (c) communicating the lower pressure to a fluid passage located in a valve assembly that is axially spaced from the restricted throat;
   (d) using the first differential pressure to move a first element located within the valve assembly from an open position to a closed position, the closed position of the first element at least partially blocking the flow of pressurized fluid through the conduit, producing a pressure pulse in the conduit;
   (e) using a second differential pressure for moving the first element from the closed position to the open position, the second differential pressure corresponding to a difference between a pressure in the conduit distal of where the flow of the pressurized fluid through the conduit is at least partially blocked by the first element, and the pressure of the pressurized fluid proximal of where the first element is at least partially blocking the flow; and
   (f) movement of the second element altering fluid paths employed for applying the first and the second differential pressures to move the first and the second elements in a cycle of reciprocating motions that produces repetitive pressure pulses in the conduit.

36. The method of claim 35, further comprising the step of providing a bypass fluid path to enable a portion of the pressurized fluid to flow past the first element when the first element is in the closed position.

37. The method of claim 36, further comprising the step of controlling an amplitude of the pressure pulse by controlling an amount of pressurized fluid flowing through the bypass path when the first element is in the closed position.

38. The method of claim 36, wherein the step of providing the bypass fluid path comprises the step of providing one or more grooves in a valve seat into which the first element moves when in the closed position, the one or more grooves conveying the pressurized fluid past the first element.

39. The method of claim 36, wherein the step of providing the bypass fluid path comprises the step of providing one or more passages that bypass a valve seat into which the first element moves when in the closed position, the one or more passages conveying the pressurized fluid past the first element.

40. The method of claim 36, wherein the step of providing the bypass fluid path comprises the step of providing a gap between the first element and a valve seat into which the first element moves when in the closed position, the gap enabling the pressurized fluid to flow through the conduit at a reduced rate compared to when the first element is in the open position.

41. The method of claim 35, further comprising the step of conveying the pressurized fluid through a valve body in which the first element is disposed, the valve body including an inlet configured to couple with the conduit through which the pressurized fluid is supplied, and an outlet configured to couple to tools distal of the valve body, all of the pressurized fluid entering the inlet flowing from the outlet.

42. The method of claim 35, further comprising the step of discharging at least some of the pressurized fluid through a port in the housing sidewall into a borehole surrounding the housing.

43. An apparatus for producing pressure pulses, comprising an elongate housing that includes:
   (a) an internal passage for conveying a pressurized fluid between an inlet disposed on one end of the housing and an outlet disposed on an opposite end of the housing, the inlet being configured to couple to a source of the pressurized fluid, and the outlet being configured convey the pressurized fluid flowing through the outlet;
   (b) a restricted throat coupled in fluid communication with the conduit to develop a first differential pressure in one or more passages opening into the restricted throat, wherein the first differential pressure results from a lower pressure in the one or more passages compared to a pressure of the pressurized fluid, the lower pressure being due to a Venturi effect as the pressurized fluid flow velocity increases through the restricted throat and past the one or more passages;
   (c) a valve assembly that is axially spaced from the restricted throat and moves from an open position to a closed position, the closed position of the valve assembly at least partially blocking the flow of pressurized fluid through the conduit; and
   (d) a fluid passage allowing the lower pressure to be communicated to said valve assembly.

44. The pulse valve of claim 43, wherein the housing includes a seat into which the valve assembly moves to at least partially block the flow of pressurized fluid through the conduit.

45. The pulse valve of claim 44, wherein the seat includes a bypass path that enables some pressurized fluid to flow through the outlet of the housing when the valve assembly is in the closed position.

46. The pulse valve of claim 45, wherein the bypass path comprises one or more ports in the seat that are in fluid communication with the internal passage conveying pressurized fluid and which are not sealed by the valve assembly when the valve assembly is in the closed position.

47. The pulse valve of claim 43, wherein the elongate housing is configured to discharge at least some of the pressurized fluid through a port in the housing sidewall into a borehole surrounding the housing.

48. The pulse valve of claim 47, wherein the bypass path comprises one or more grooves in the seat that are in fluid communication with the internal passage conveying pressurized fluid and which are not sealed by the valve assembly when the valve assembly is in the closed position.

49. The pulse valve of claim 45, wherein the bypass path comprises an annular opening between the valve assembly and the seat that is in fluid communication with the internal passage and which is not sealed by the valve assembly when the valve assembly is in the closed position.

50. The pulse valve of claim 43, wherein the elongate housing is configured so that all of the pressurized fluid entering the inlet flows through the outlet.

\* \* \* \* \*